US009764760B2

(12) United States Patent
Kuramochi

(10) Patent No.: US 9,764,760 B2
(45) Date of Patent: Sep. 19, 2017

(54) VEHICLE STEERING DEVICE

(71) Applicant: HONDA MOTOR CO., LTD., Tokyo (JP)

(72) Inventor: Toshikatsu Kuramochi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 104 days.

(21) Appl. No.: 14/582,424

(22) Filed: Dec. 24, 2014

(65) Prior Publication Data
US 2015/0175199 A1    Jun. 25, 2015

(30) Foreign Application Priority Data

Dec. 24, 2013  (JP) ................................. 2013-265795

(51) Int. Cl.
| B62D 6/00 | (2006.01) |
| B62D 6/10 | (2006.01) |
| B62D 5/04 | (2006.01) |
| B60W 30/045 | (2012.01) |
| B60W 10/18 | (2012.01) |
| B60W 10/20 | (2006.01) |
| B60W 10/184 | (2012.01) |
| B62D 5/00 | (2006.01) |

(52) U.S. Cl.
CPC .............. *B62D 6/10* (2013.01); *B60W 10/18* (2013.01); *B60W 10/184* (2013.01); *B60W 10/20* (2013.01); *B60W 30/045* (2013.01); *B62D 5/001* (2013.01); *B62D 5/008* (2013.01); *B62D 5/046* (2013.01); *B62D 5/0478* (2013.01); *B62D 6/002* (2013.01); *B62D 6/008* (2013.01)

(58) Field of Classification Search
None
See application file for complete search history.

(56) References Cited

U.S. PATENT DOCUMENTS 7,359,778 B2 * 4/2008 Goto ................... B62D 6/002
                                                     180/443
2005/0279562 A1 * 12/2005 Hara ................... B62D 5/003
                                                     180/402

(Continued)

FOREIGN PATENT DOCUMENTS

| JP | 2006-182056 A | 7/2006 |
| JP | 2007-203885 A | 8/2007 |
| JP | 2009-226990 A | 10/2009 |

OTHER PUBLICATIONS

Japanese Office Action dated Nov. 10, 2015 (mailing date), issued in counterpart Japanese Patent Application No. 2013-2657950 with English translation.

(Continued)

*Primary Examiner* — Jerrah Edwards
*Assistant Examiner* — Donald J Wallace
(74) *Attorney, Agent, or Firm* — Westerman, Hattori, Daniels & Adrian, LLP

(57) ABSTRACT

A mode setting unit of ECU controls a turning angle so as to be a turning angle in accordance with a steering angle detected by a steering angle sensor. When a vehicle is started, the mode setting unit controls an angle ratio so as to be an angle ratio that is equal to or smaller than a ratio of the turning angle to the steering angle (mechanical angle ratio) when a steering wheel and a turning mechanism are connected by a clutch mechanism.

10 Claims, 5 Drawing Sheets

(56) References Cited

U.S. PATENT DOCUMENTS

| | | | |
|---|---|---|---|
| 2008/0156572 A1* | 7/2008 | Kasahara | B62D 5/003 180/402 |
| 2008/0183354 A1* | 7/2008 | Higashi | B62D 5/003 701/43 |
| 2008/0190687 A1* | 8/2008 | Shirakawa | B62D 5/001 180/444 |
| 2010/0235049 A1* | 9/2010 | Kariatsumari | B62D 5/046 701/41 |
| 2011/0127104 A1* | 6/2011 | Shibahata | B62D 5/001 180/446 |
| 2011/0259663 A1* | 10/2011 | Goutsu | B62D 6/002 180/402 |
| 2012/0197494 A1* | 8/2012 | Biegert | B62D 15/0215 701/42 |

OTHER PUBLICATIONS

Japanese Office Action dated Jul. 21, 2015 (mailing date), issued in counterpart Japanese Patent Application No. 2013-2657950 with English translation.

* cited by examiner

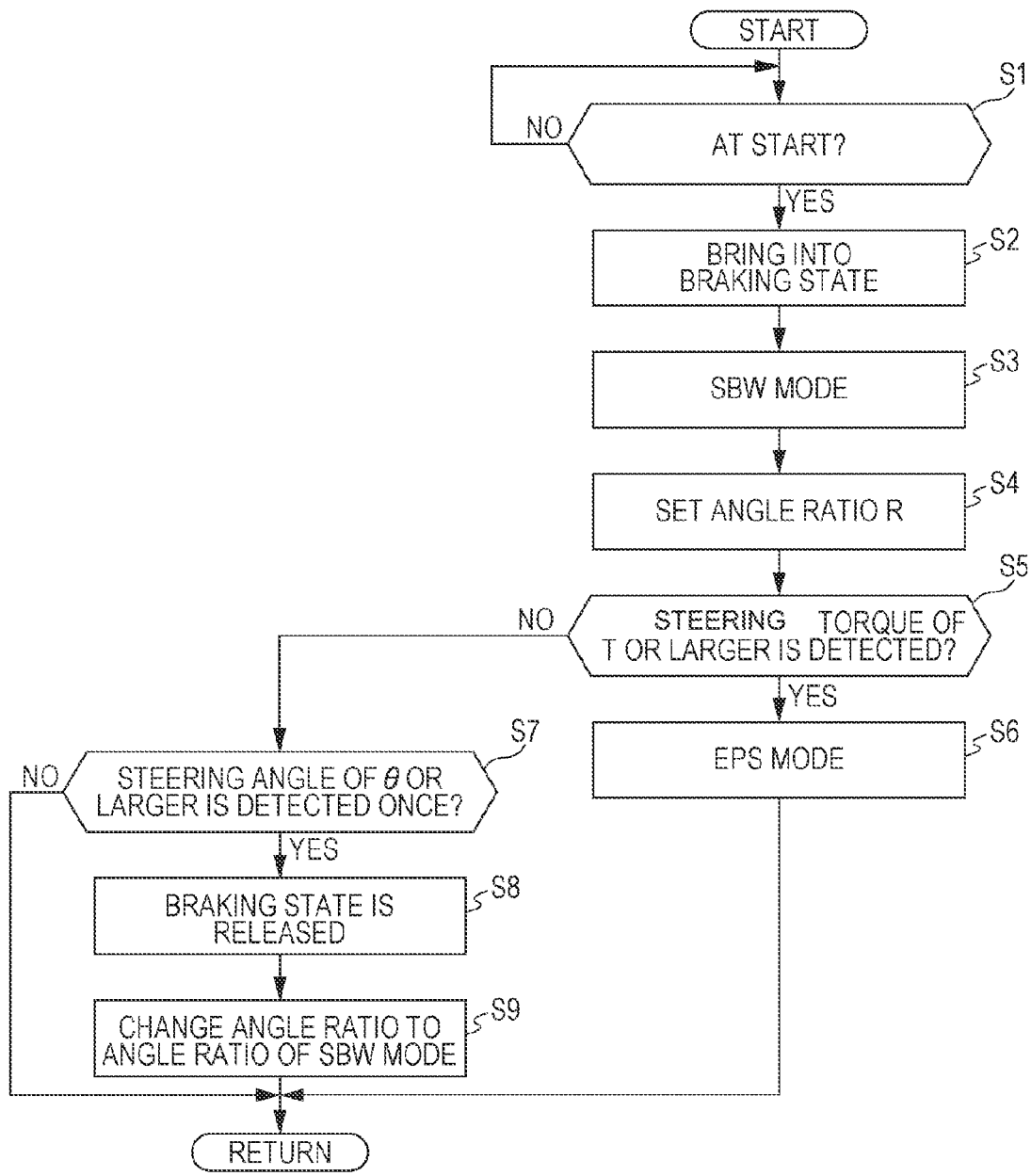

VEHICLE STEERING DEVICE

CROSS REFERENCES TO RELATED APPLICATIONS

The present application claims priority under 35 U.S.C. §119 to Japanese Patent Application No. 2013-265795, filed Dec. 24, 2013, entitled "Vehicle Steering Device." The contents of this application are incorporated herein by reference in their entirety.

TECHNICAL FIELD

The present disclosure relates to a vehicle steering device.

BACKGROUND

There is known so-called steer by wire system for a steering device of a vehicle. The steer by wire system drives a turning mechanism by a motor without mechanical coupling between a steering wheel and the turning mechanism. That is, turning is performed in accordance with an operation of steering by electrically controlling the motor based on detection results of an operation direction and a steering angle of steering and by adding a turning angle which corresponds to the steering angle of steering to the turning mechanism.

Such a steering device having the steer by wire system includes a clutch mechanism that connects and disconnects the steering wheel and the turning mechanism. That is, when the steering device functions as the steer by wire system, the clutch mechanism is released, and when the steering device functions as a normal electrically operated power steering device, the clutch mechanism is connected.

Japanese Unexampled Patent Application Publication No. 2007-203885 discloses a steering device having a steer by wire function, the device including a unit that determines whether a clutch mechanism is in a connection state or a release state when the clutch mechanism is erroneously connected.

Meanwhile, when the steering device functions as the steer by wire system, feedback control is executed for the turning angle based on the detection value of the steering angle etc. In the steer by wire system, the ratio of the turning angle to the steering angle (angle ratio) is increased when a vehicle travels at lower vehicle speed, so that the turning angle is largely changed although the steering wheel is operated only slightly (quick ratio). In contrast, the angle ratio is decreased when the vehicle travels at higher vehicle speed, so that the turning angle is slightly changed although the steering wheel is operated by a large angle (slow ratio).

In this case, if the clutch mechanism is erroneously connected due to biting of a foreign substance (see Japanese Unexampled Patent Application Publication No. 2007-203885), steering is performed with an angle ratio (mechanical angle ratio) mechanically determined by the mechanism of the steering device, instead of an angle ratio set by a control system of steer by wire.

If the steer by wire system is controlled during erroneous connection of the clutch mechanism, the motor is operated to compensate the deviation between the quick ratio and the mechanical angle ratio. However, the deviation is not compensated but increased as long as the clutch mechanism is erroneously connected. This causes that, since the turning mechanism and the steering wheel are connected, the steering wheel is unintentionally rotated (self steer), and thus the driver may feel uncomfortable.

In contrast, if the clutch mechanism is erroneously connected with the slow ratio rather than the mechanical angle ratio, an actual turning angle exceeds a target turning angle of wheels set by the steering wheel. The motor is operated in order to have the actual turning angle meet the target turning angle. This causes that the steering wheel is locked (steering lock), and hence the driver may feed uncomfortable.

SUMMARY

It is desirable to provide a vehicle steering device having a steer by wire function that can reduce uncomfortable feeling of a driver even if a clutch mechanism is erroneously connected.

According to an aspect of the disclosure, there is provided a vehicle steering device including a steering unit that performs an operation for steering a vehicle; a turning mechanism that turns a turning wheel of the vehicle while the turning mechanism is not coupled with the steering unit; a clutch mechanism that connects and disconnects the steering unit and the turning mechanism; a steering angle detection unit that detects a steering angle of the steering unit; and a turning angle control unit that controls a turning angle of the turning mechanism so as to be a turning angle in accordance with the steering angle detected by the steering angle detection unit. When the vehicle is started, the turning angle control unit controls an angle ratio which is a ratio of the turning angle to the steering angle, so that the angle ratio becomes a first value which is equal to or smaller than a ratio of the turning angle to the steering angle while the steering unit and the turning mechanism are connected by the clutch mechanism.

Accordingly, when the vehicle is started, the angle ratio is controlled to be equal to or smaller than the ratio of the turning angle to the steering angle (mechanical angle ratio) which is the ratio when the steering unit and the turning mechanism are connected by the clutch mechanism. Hence, even if the clutch mechanism is erroneously connected due to, for example, biting of a foreign substance etc., self steer does not occur when the vehicle is started in case of erroneous connection of the clutch mechanism, and therefore uncomfortable feeling given to a driver can be reduced.

Also, in case of erroneous connection of the clutch mechanism, if the first value is set to be smaller than the mechanical angle ratio, (a steering wheel of) an operation unit is locked. Hence, the driver can be notified about occurrence of abnormality. It may be expected that the driver stops driving of the vehicle once and attempts to re-start the vehicle. Therefore, erroneous connection of the clutch mechanism due to biting of a foreign substance etc. is more likely released.

In this case, the vehicle steering device may further include a steering torque detection unit that detects a steering torque of the steering unit. When the vehicle is started, if the steering torque detection unit detects a steering torque of a second value or larger, the turning angle control unit may control the turning angle in accordance with the steering torque detected by the steering torque detection unit.

Accordingly, when the steering torque of the second value or larger is detected, the mode is switched from so-called SBW mode to so-called EPS mode. Hence, control based on the steering torque can be provided. In other words, a function as a normal electrically operated power steering device can be provided.

In this state, the vehicle steering device may further include an instruction transmitting unit that transmits an instruction to a braking control unit that controls a braking device of the vehicle to keep a braking state until the steering angle detection unit detects a steering angle of a third value or larger after the vehicle is started.

As long as the clutch mechanism can be normally released, the steering unit can provide steering by the third value or larger. Hence, it can be determined that startup normally occurred in so-called SBW mode, braking is released, and the vehicle can be driven. Also, this can prevent the vehicle from shifting to traveling state while the clutch mechanism is erroneously connected, and in the control state in the SBW mode, that is, in the state in which the steering wheel is locked.

In this case, if the steering angle detection unit detects a steering angle of a fourth value or larger after the vehicle is started, the turning angle control unit may control the angle ratio to be in a predetermined state.

With this aspect, if the steering angle detection unit detects the steering angle of the fourth value or larger after the vehicle is started, it can be determined that the clutch mechanism is released and the SBW mode is normally started, and hence the angle ratio can be gradually shifted to an angle ratio corresponding to the vehicle speed.

Accordingly, there can be provided the vehicle steering device having the steer by wire function that can reduce the uncomfortable feeling given to the driver even if the clutch mechanism is erroneously connected.

BRIEF DESCRIPTION OF THE DRAWINGS

The advantages of the disclosure will become apparent in the following description taken in conjunction with the following drawings.

FIG. 5 is a flowchart describing processing executed by a mode setting unit of the vehicle steering device according to the embodiment of the disclosure.

DETAILED DESCRIPTION

An embodiment of the present disclosure is described below.

Figure 1:
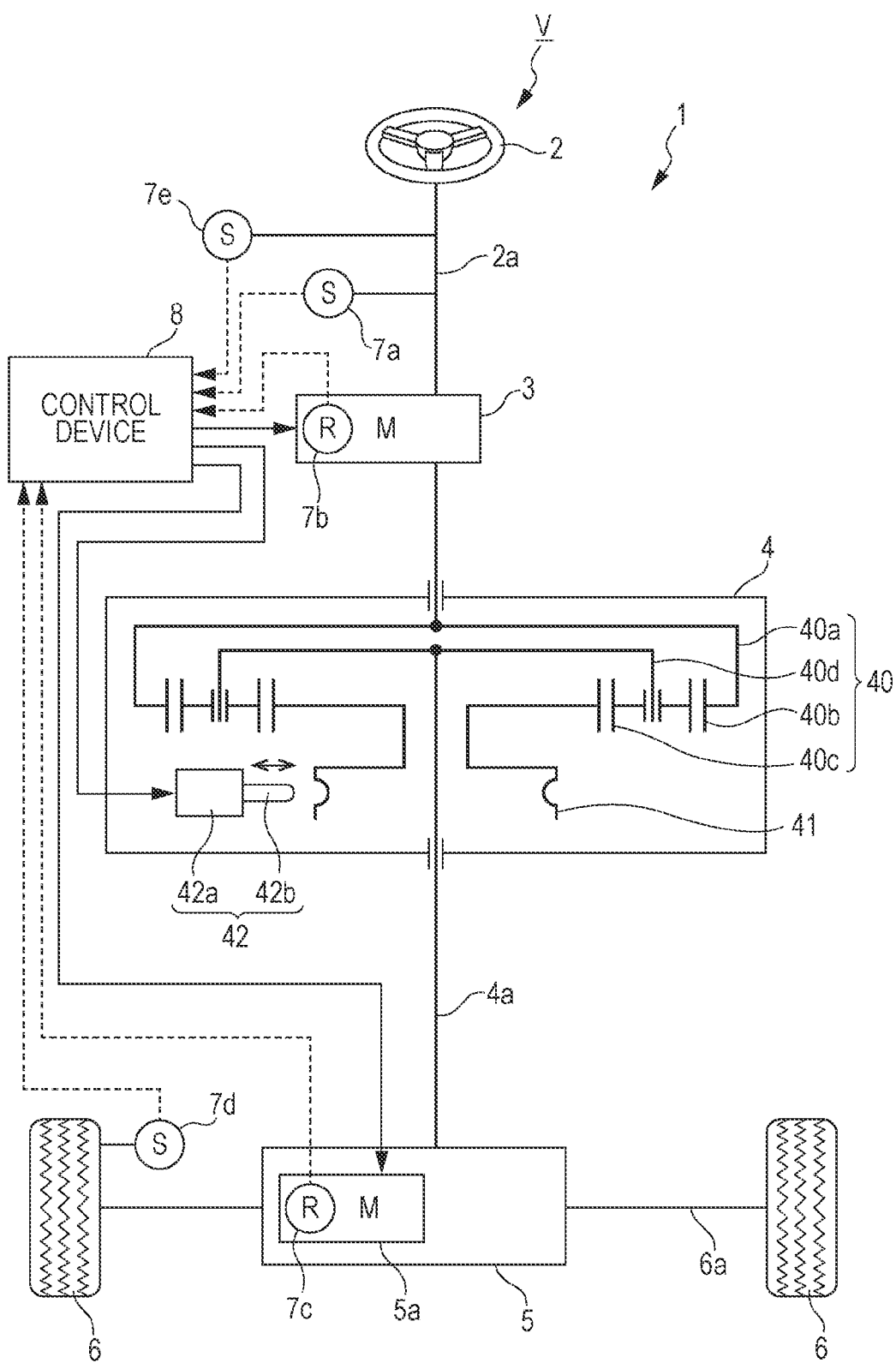
FIG. 1 is an illustration showing a general schematic configuration of a vehicle steering device according to an embodiment of the present disclosure.

FIG. 1 is an illustration showing a general schematic configuration of a vehicle steering device according to this embodiment.

As shown in FIG. 1, a vehicle steering device 1 is provided in a vehicle V having turning wheels 6. The vehicle steering device 1 includes a steering wheel 2, a clutch mechanism 4, and a turning device 5.

The steering wheel 2 rotates integrally with an input shaft 2a. The steering wheel 2 and the input shaft 2a form a "steering unit" that is rotationally operated by a driver for steering. The turning device 5 converts a rotational motion of an output shaft 4a into a linear motion of a rack shaft 6a. The rack shaft 6a is connected with the turning wheels 6 through tie rods (not shown). The turning wheels 6 are turned by the linear motion of the rack shat 6a.

The turning device (steering gear box) 5 converts the rotational motion of the output shaft 4a into the linear motion of the rack shaft 6a by a rack and pinion mechanism (not shown). In the rack and pinion mechanism, a rack meshes with a pinion and the rack and the pinion are housed in a housing of the steering gear box 5. The rack is formed at the rack shaft 6a. The turning device 5 has an electric motor (turning motor) 5a. The turning motor 5a drives the rack shaft 6a for the linear motion. When the turning motor 5a drives the rack shaft 6a, the rack shaft 6a is linearly moved, and the turning wheels 6 are turned.

The output shaft 4a, the turning device 5, the turning motor 5a, and the rack shaft 6a form a "turning mechanism" that turns the turning wheels 6.

An electric motor (reaction force motor) 3 is connected with the input shaft 2a. The reaction force motor 3 generates a torque for rotating the input shaft 2a around the axis. Accordingly, when the vehicle steering device 1 is operated in a SBW mode (described later), a reaction force (resistance) to steering is transmitted to the hands of the driver who grips the steering wheel 2.

The reaction force motor 3 and the turning motor 5a are controlled by a control device 8. That is, the reaction force motor 3 and the turning motor 5a are each driven in response to an instruction (control signal) given from the control device 8.

The input shaft 2a is provided with a torque sensor 7a. The torque sensor 7a detects a torque generated at the input shaft 2a, and inputs its detection signal to the control device 8.

The reaction force motor 3 and the turning motor 5a respectively have resolvers (reaction force motor resolver 7b and turning motor resolver 7c, arranged respectively). The reaction force motor resolver 7b detects a rotational motion amount (rotation angle) of the reaction force motor 3, and inputs its detection signal to the control device 8. Also, the turning motor resolver 7c detects a rotational motion amount (rotation angle) of the turning motor 5a, and inputs its detection signal to the control device 8.

Further, the control device 8 receives an input of a detection signal (wheel speed signal) of a wheel speed sensor 7d. The wheel speed sensor 7d is a sensor that detects the rotational speed of the wheels (turning wheels 6). The wheel speed signal is a pulse wave that generates a predetermined number of pulses every single rotation of the wheels. The control device 8 calculates the vehicle speed of the vehicle V in accordance with the wheel speed signal input from the wheel speed sensor 7d. Hence, the wheel speed sensor 7d serves as a vehicle speed sensor that detects the vehicle speed.

The steering wheel 2 (input shaft 2a) is provided with a steering angle sensor 7e that detects a steering angle, and inputs a detection signal of the steering angle sensor 7e to the control device 8. The control device 8 can calculate the steering angle of the steering wheel 2 (input shaft 2a) based on the detection signal input from the steering angle sensor 7e. The control device 8 executes midpoint correction for the resolver in accordance with the steering angle of the steering wheel 2 detected by the steering angle sensor 7e.

The clutch mechanism 4 includes a planetary gear mechanism 40. The planetary gear mechanism 40 includes a ring gear 40a, a planetary gear 40b, and a sun gear 40c. Also, the clutch mechanism 4 includes a lock gear 41 and a lock device 42. The lock device 42 includes a lock pin 42b that is engaged with the lock gear 41, and an electromagnetic solenoid 42a that drives the lock pin 42b.

The ring gear 40a rotates integrally with the input shaft 2a. The sun gear 40c freely rotates around the rotation axis that is coaxial with the output shaft 4a. The planetary gear 40b is rotatably supported by a planetary carrier 40d that rotates integrally with the output shaft 4a.

Also, the lock gear 41 is an external tooth gear, and rotates integrally with the sun gear 40c. The lock pin 42b is engaged with a tooth groove of the lock gear 41. When the lock pin 42b is engaged, the rotation of the lock gear 41 is restricted. The lock pin 42b is urged in a direction in which the lock pin 42b approaches the lock gear 41 by an urging portion (not shown) and is engaged with the lock gear 41.

The electromagnetic solenoid 42a displaces the lock pin 42b when excitation current is supplied to disengage the lock pin 42b from the lock gear 41.

The lock device 42 is controlled by the control device 8. The control device 8 supplies excitation current to the electromagnetic solenoid 42a, so that the lock pin 42b is disengaged from the lock gear 41.

In the clutch mechanism 4 configured as described above, if the lock pin 42b is engaged with the lock gear 41, the rotation of the sun gear 40c which rotates integrally with the lock gear 41 is restricted.

If the driver rotationally operates the steering wheel 2 in this state, the ring gear 40a is rotated by the rotation of the input shaft 2a. Since the rotation of the sun gear 40c is restricted, the planetary gear 40b revolves around the sun gear 40c while the planetary gear 40b rotates on its axis. As the result of the revolution of the planetary gear 40b, the planetary carrier 40d that rotatably supports the planetary gear 40b rotates, which then rotates the output shaft 4a that rotates integrally with the planetary carrier 40d.

In this way, while the lock pin 42b is engaged with the lock gear 41, the rotation of the input shaft 2a is transmitted to the output shaft 4a. That is, the clutch mechanism 4 is in a state (power transmission state) in which the input shaft 2a is engaged with the output shaft 4a. When the clutch mechanism 4 becomes the power transmission state, rotational power that is input to the input shaft 2a when the driver rotationally operates the steering wheel 2 is transmitted to the turning mechanism (the output shaft 4a, the turning device 5, and the rack shaft 6a).

When the lock pin 42b is disengaged from the lock gear 41, the sun gear 40c that rotates integrally with the lock gear 41 becomes freely rotatable.

If the driver rotationally operates the steering wheel 2 in this state, the ring gear 40a is rotated by the rotation of the input shaft 2a. Also, the planetary gear 40b attempts to rotate on its axis and revolve around the sun gear 40c. However, the turning wheels 6 are connected with the planetary carrier 40d through the output shaft 4a and the rack shaft 6a. Owing to this, the resistance to the rotation of the planetary carrier 40d is markedly larger than the resistance to the rotation of the sun gear 40c in the freely rotatable state. Hence, when the planetary gear 40b rotates, the sun gear 40c with a small resistance to the rotation rotates (rotates on its axis), but the planetary carrier 40d does not rotate. Therefore, the output shaft 4a does not rotate.

In this way, while the lock pin 42b is disengaged from the lock gear 41, the rotation of the input shaft 2a is not transmitted to the output shaft 4a. That is, the clutch mechanism 4 is brought into a state (power shut-off state) in which the input shaft 2a is disconnected from the output shaft 4a. When the clutch mechanism 4 becomes the power shut-off state, rotational power that is input to the input shaft 2a when the driver rotationally operates the steering wheel 2 is not transmitted to the turning mechanism (the output shaft 4a, the turning device 5, and the rack shaft 6a).

In this way, the clutch mechanism 4 is arranged between the operation unit (the steering wheel 2 and the input shaft 2a) and the steering mechanism (the output shaft 4a, the turning device 5, and the rack shaft 6a). The state of the clutch mechanism 4 is switched between the power transmission state in which the rotational power is transmitted from the operation unit to the turning mechanism, and the power shut-off state in which the transmission of the rotational power from the operation unit to the turning mechanism is shut off.

The control device 8 controls the clutch mechanism 4 (the lock device 42) by switching the state between supply of excitation current to the electromagnetic solenoid 42a and stop of the supply, and switches the state of the clutch mechanism 4 (between the power transmission state and the power shut-off state).

The control device 8 controls the reaction force motor 3, the clutch mechanism 4, and the turning motor 5a, and thus controls the vehicle steering device 1. The control device 8 controls the vehicle steering device 1 in a steer by wire (SBW) mode and an electronic power steering (EPS) mode (electrically operated power steering mode).

The control device 8 controls the vehicle steering device 1 in the SBW mode when the vehicle V normally travels. To be specific, the control device 8 supplies excitation current to the electromagnetic solenoid 42a, so that the lock pin 42b is disengaged from the lock gear 41. Accordingly, the clutch mechanism 4 is switched to the power shut-off state, and the vehicle steering device 1 is set in the SBW mode. In the SBW mode, the vehicle steering device 1 generates a turning force by driving of the turning motor 5a.

Also, the control device 8 shifts the mode from the SBW mode to the EPS mode, for example, when a defect occurs in an electric system of the vehicle V. That is, the control device 8 stops the supply of excitation current to the electromagnetic solenoid 42a, so that the lock pin 42b is engaged with the lock gear 41. Accordingly, the clutch mechanism 4 is switched to the power transmission state. Hence, even if a defect occurs in the electric system of the vehicle v, the driver can steer the vehicle V by rotationally operating the steering wheel 2. That is, in the EPS mode, a supplemental force for manual steering of the driver is generated by driving of the turning motor 5a.

When the vehicle steering device 1 is controlled in the SBW mode (that is, when the clutch mechanism 4 is switched to the power shut-off state), the control device 8 calculates a rotational operation amount (steering angle) of the steering wheel 2. That is, the control device 8 calculates the steering angle based on the detection signal input from the reaction force motor resolver 7b. The control device 8 calculates the turning angle of the turning wheels 6 corresponding to the steering angle. Further, the control device 8 calculates an operation amount (stroke) of the rack shaft 6a corresponding to the turning angle of the turning wheels 6. The control device 8 uses the calculated stroke as a target stroke. That is, the control device 8 controls the turning motor 5a so that the rack shaft 6a is operated only by a target stroke. That is, the control device 8 gives an instruction corresponding to the steering angle to the turning motor 5a to turn the turning wheels 6.

Also, the control device 8 controls the reaction force motor 3 to give a predetermined torque (steering reaction force torque) to the input shaft 2a. When the steering reaction force torque is given to the input shaft 2a, a pseudo steering reaction force is generated for the driver. Then, comfortable steering feeling is given to the vehicle steering device 1.

The vehicle steering device 1 of this embodiment executes an operation in association with a braking device of the vehicle. The braking device of the vehicle is described next.

Figure 2:
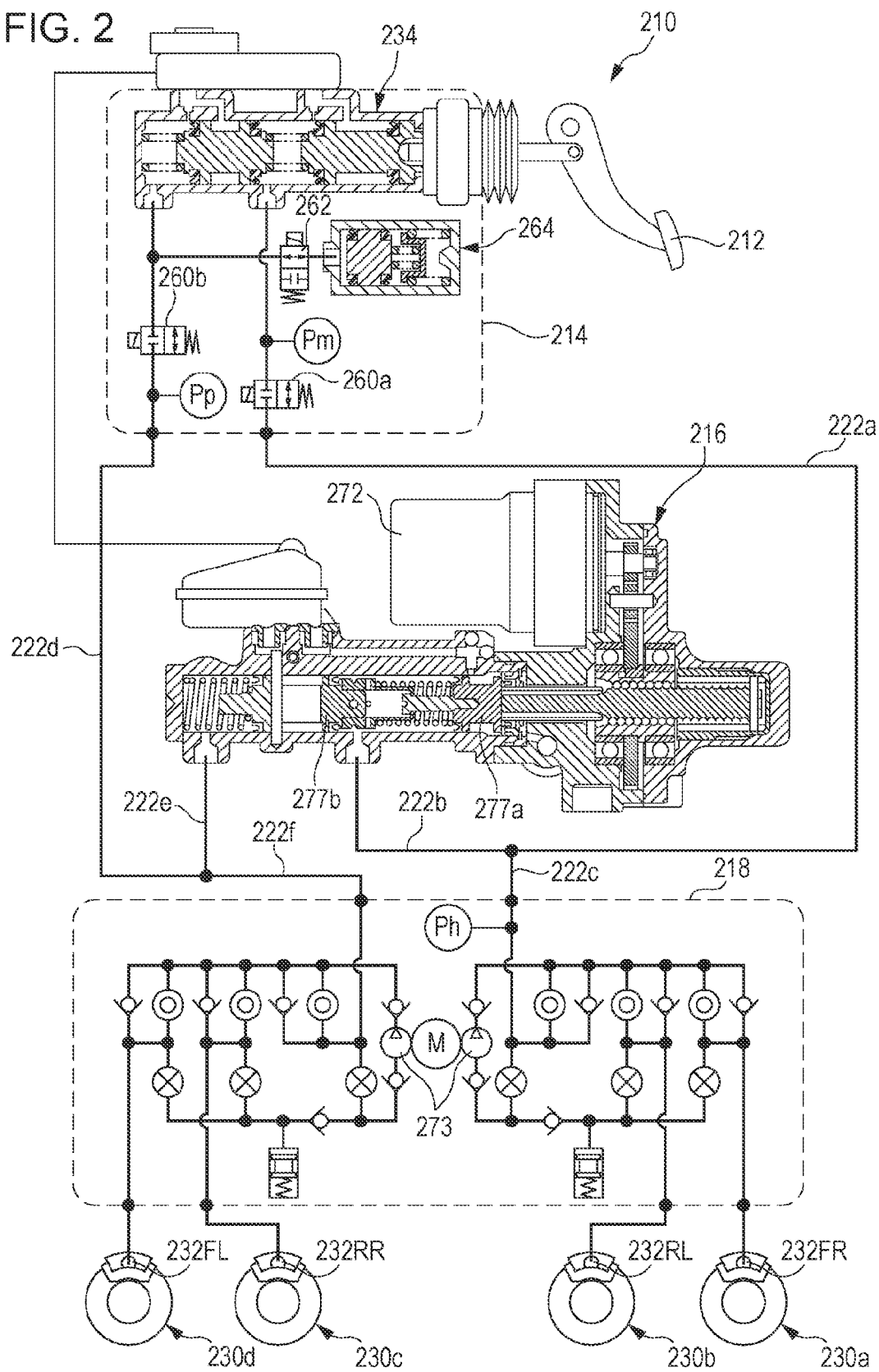
FIG. 2 is a configuration diagram showing an overview of a braking device associated with the vehicle steering device according to the embodiment of the disclosure.

FIG. 2 is a configuration diagram representing an overview of a braking device 210 according to this embodiment. This braking device 210 is a device that generates a frictional braking force of the vehicle by so-called brake by wire system.

The braking device 210 includes an input device 214 having a master cylinder 234 that converts a depression force input by the driver by an operation of a brake pedal 212 into a brake fluid pressure, a motor cylinder device 216 that generates a brake fluid pressure in accordance with the brake fluid pressure generated by the master cylinder or regardless of the brake fluid pressure, a vehicle behavior stabilizing device 218, and disk brake mechanisms 230*a* to 230*d*. The motor cylinder device 216 includes first and second slave pistons 277*a* and 277*b* that generate brake fluid pressures when receiving a driving force of an electric motor 272.

Pipes 222*a* to 222*f* are provided with brake fluid pressure sensors Pm, Pp, and Ph that detect brake fluid pressures of respective parts. Also, the vehicle behavior stabilizing device 218 includes a brake fluid pressure increasing pump 273.

Wheel cylinders 232FR, 232RL, 232RR, and 232FL are connected with the motor cylinder device 216 (through the vehicle behavior stabilizing device 218). The wheel cylinder 232FR generates a frictional braking force by the fluid pressure at the disk brake mechanism 230*a* provided at the front right wheel of the vehicle (not shown). The wheel cylinder 232RL generates a frictional braking force by the fluid pressure at the disk brake mechanism 230*b* provided at the rear left wheel. The wheel cylinder 232RR generates a frictional braking force by the fluid pressure at the disk brake mechanism 230*c* provided at the rear right wheel. The wheel cylinder 232FL generates a frictional braking force by the fluid pressure at the disk brake mechanism 230*d* provided at the front left wheel.

Next, a basic operation of the braking device 210 is described. In the braking device 210, in a normal operation of the motor cylinder device 216 and the control system that controls the brake by wire system, when the driver depresses the brake pedal 212, so-called brake by wire brake system becomes active. To be specific, in the braking device 210 in the normal operation, when the driver depresses the brake pedal 212 (the depression is detected by a brake pedal stroke sensor 201, described later), while a first shut-off valve 260*a* and a second shut-off valve 260*b* shut off communication between the master cylinder 234 and the disk brake mechanisms 230*a* to 230*d* (the wheel cylinders 232FR, 232RL, 232RR, and 232FL) that brake the respective wheels, the motor cylinder device 216 operates the disk brake mechanisms 230*a* to 230*d* by using the brake fluid pressure generated by driving of the motor 272, and brake the respective wheels.

Also, in the normal operation, the first shut-off valve 260*a* and the second shut-off valve 260*b* are shut off, whereas a third shut-off valve 262 is opened. Brake fluid flows from the master cylinder 234 to a stroke simulator 264, that is, the brake fluid moves even though the first shut-off valve 260*a* and the second shut-off valve 260*b* are shut off. Thus, a stroke is generated when the brake pedal 212 is operated, and a pedal reaction force is generated.

In contrast, in the braking device 210, if the driver depresses the brake pedal 212 in an abnormal state in which the motor cylinder device 216 etc. does not operate, an existing hydraulic brake system becomes active. To be specific, in the braking device 210 in the abnormal state, when the driver depresses the brake pedal 212, the first shut-off valve 260*a* and the second shut-off valve 260*b* are opened and the third shut-off valve 262 is closed, the brake fluid pressure generated at the master cylinder 234 is transmitted to the disk brake mechanisms 230*a* to 230*d* (the wheel cylinders 232FR, 232RL, 232RR, and 232FL), then the disk brake mechanisms 230*a* to 230*d* (the wheel cylinders 232FR, 232RL, 232RR, and 232FL) are operated, and the respective wheels are braked.

The configurations and operations of the other parts of the input device 214, motor cylinder device 216, and vehicle behavior stabilizing device 218 are known, and hence the detailed description is omitted.

Figure 3:
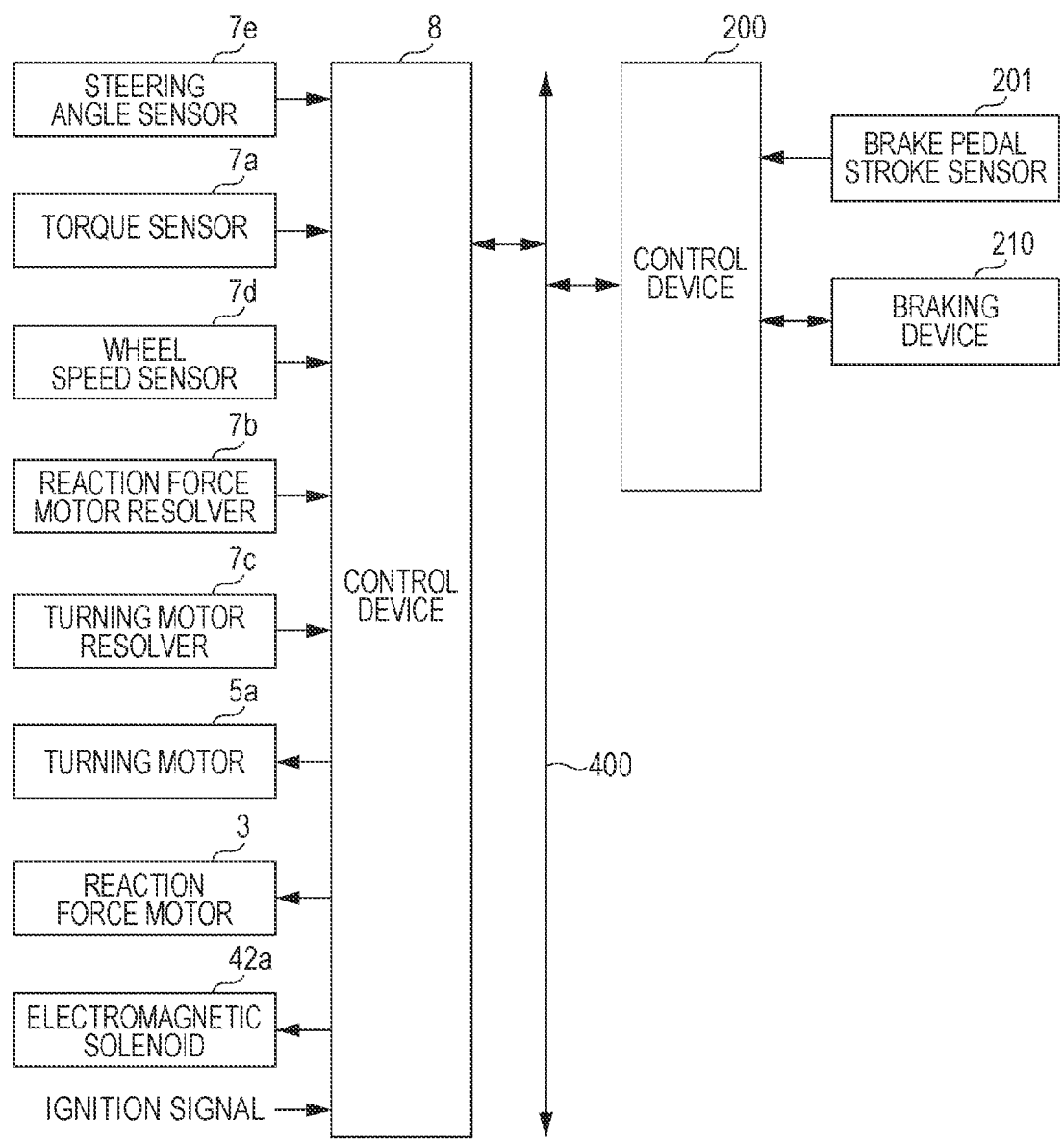
FIG. 3 is a block diagram showing electric connection of a control system of the vehicle steering device according to the embodiment of the disclosure.

FIG. 3 is a block diagram showing electric connection of the control system of the vehicle steering device 1. This control system is configured around the control device 8 (SBW-ECU (electronic control unit)). The control device 8 mainly includes a microcomputer and various interface devices. As described above, the various sensors and various actuators, such as the steering angle sensor 7*e*, the torque sensor 7*a*, the wheel speed sensor 7*d*, the reaction force motor resolver 7*b*, the turning motor resolver 7*c*, the turning motor 5*a*, the reaction force motor 3, and the electromagnetic solenoid 42*a* are connected with the control device 8. Also, an ignition signal generated when an ignition switch (not shown) of the vehicle is turned ON is input.

A control device 200 (ESB-ECU) (braking control unit) is a control device that controls the above-described braking device 210. The brake pedal stroke sensor 201 that detects a depression amount of the brake pedal 212, and the braking device 210 (whose various sensors and actuators) are connected with the control device 200.

The control device 8 and the control device 200 can communicate with each other through a controller area network (CAN) 400 that is a communication system that allows communication between respective parts in the vehicle.

Next, the contents of control processing executed by the vehicle steering device 1 are described on the basis of the control system in FIG. 3.

Figure 4:
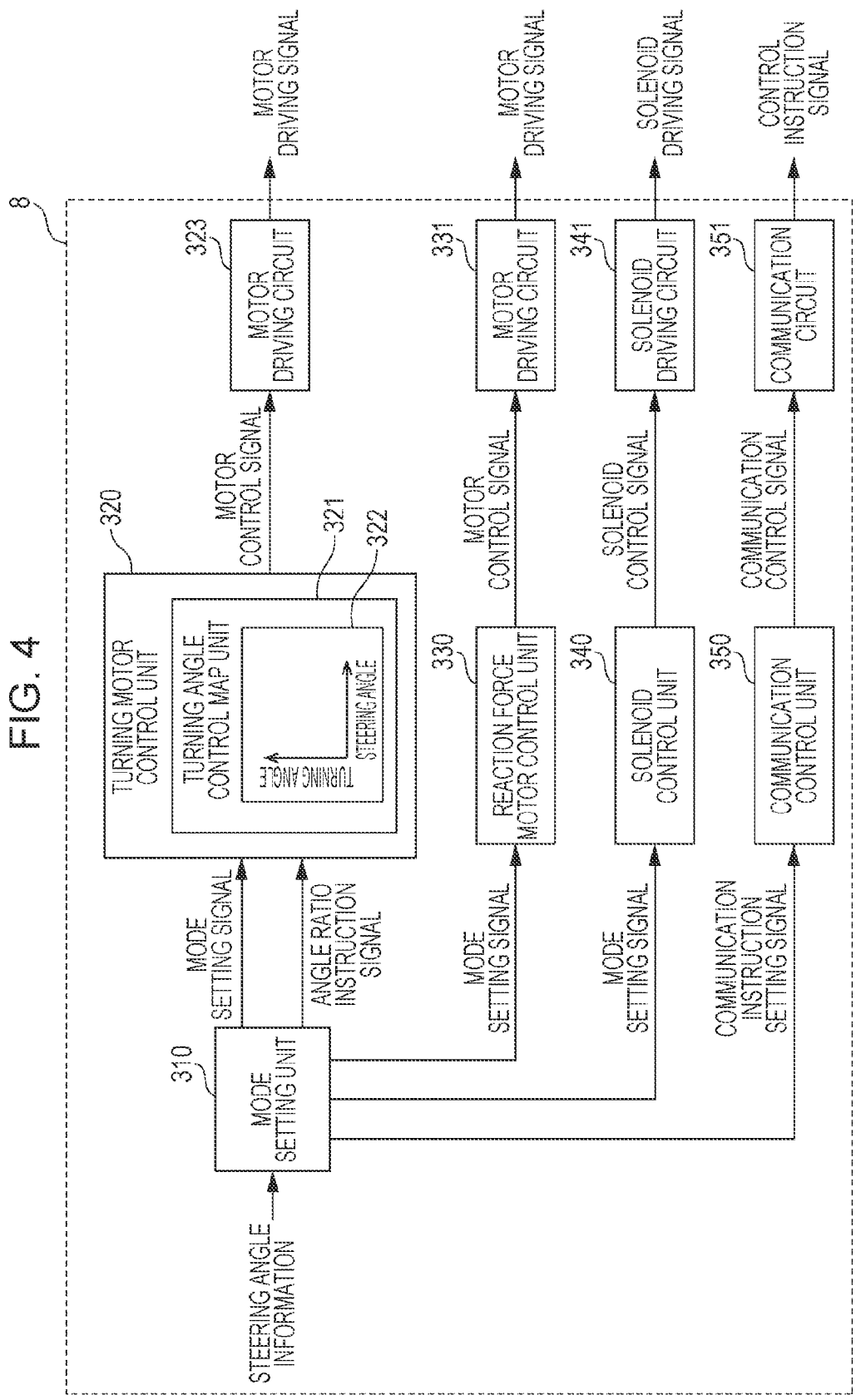
FIG. 4 is a block diagram showing a configuration of a control device of the vehicle steering device according to the embodiment of the disclosure.

As shown in FIG. 4, the control device 8 includes a mode setting unit 310 (turning angle control unit, instruction transmitting unit). The mode setting unit 310 sets the operation mode of the vehicle steering device 1. To be specific, the operation mode of the vehicle steering device 1 includes the SBW mode, the EPS mode, and a manual steering mode. The SBW mode is a mode in which a turning force is generated only by an output of an actuator such as the turning motor 5*a*, so that the vehicle steering device 1 serves as the steering device by the steer by wire system as described above. The EPS mode is a mode in which a turning force manually provided by the driver through the rotation of the steering wheel 2 is assisted by driving of an actuator such as the turning motor 5*a*, so that the vehicle steering device 1 serves as the normal electrically operated power steering device as described above. The manual steering mode is a mode in which a turning force is obtained in the vehicle steering device 1 only by a manual force of the driver through the rotation of the steering wheel 2 without the assist of an actuator such as the turning motor 5*a*. The mode setting unit 310 outputs a mode setting signal to a turning motor control unit 320, a reaction force motor control unit 330, and a solenoid control unit 340 so as to execute mode switching according to a predetermined condition. Also, the mode setting unit 310 outputs a communication instruction signal which serves as an instruction for executing predetermined communication, to a communication control unit 350.

The turning motor control unit 320 controls the turning motor 5a. That is, the turning motor control unit 320 outputs a motor control signal to a motor driving circuit 323 that drives the turning motor 5a by a motor driving signal, and controls the operation of the turning motor 5a. The turning motor control unit 320 includes a turning angle control map unit 321 that has a control map 322 and controls the turning angle of the turning motor 5a according to the control map 322. That is, although detailed illustration or description is omitted, the turning motor control unit 320 detects three-phase alternating current that is supplied from the motor driving circuit 323 to the turning motor 5a, detects the rotation angle of the turning motor 5a, and thus executes feedback control of the three-phase alternating current that is supplied to the motor driving circuit 323.

The reaction force motor control unit 330 controls the reaction force motor 3. That is, the reaction force motor control unit 330 outputs a motor control signal to a motor driving circuit 331 that drives the reaction force motor 3 by a motor driving signal, and controls the operation of the reaction force motor 3.

The solenoid control unit 340 controls the electromagnetic solenoid 42a. That is, the solenoid control unit 340 outputs a solenoid control signal to a solenoid driving circuit 341 that drives the electromagnetic solenoid 42a by a solenoid driving signal, and controls the operation of the electromagnetic solenoid 42a.

The turning motor control unit 320, the reaction force motor control unit 330, and the solenoid control unit 340 operate the turning motor 5a, the reaction force motor 3, and the electromagnetic solenoid 42a, in accordance with mode setting by the mode setting signal from the mode setting unit 310.

That is, in the SBW mode, the turning motor control unit 320 controls the turning motor 5a to output the turning force of the turning wheels 6 only by the turning force of the turning motor 5a etc. based on the detection value of the steering angle sensor 7e. In the EPS mode, the turning motor control unit 320 causes the turning motor 5a to output the turning force of the turning wheels 6 so as to assist the rotation torque by the rotation of the steering wheel 2 by the driver based on the detection value of the torque sensor 7a. In the manual mode, the turning motor control unit 320 does not drive the turning motor 5a.

Also, the turning angle control map unit 321 executes feedback control for the turning angle with respect to the steering angle of the steering wheel 2. That is, the turning angle control map unit 321 calculates a target turning angle based on a predetermined angle ratio from the steering angle of the steering wheel 2, and executes feedback control so that an actual turning angle meets a target turning angle.

That is, the rotation angle of the turning motor 5a formed of a brushless motor or the like is detected (by the turning motor resolver 7c or the like of the turning motor 5a), and control is provided so that the rotation angle meets a target value. To be specific, when the vehicle travels at lower vehicle speed (the vehicle speed is detected by the wheel speed sensor 7d), control is provided so that the turning angle becomes large relative to the steering angle (quick ratio). Also, when the vehicle travels at higher vehicle speed, control is provided so that the turning angle becomes small relative to the steering angle (slow ratio).

In the SBW mode etc., the reaction force motor control unit 330 controls the reaction force motor 3 so as to give a necessary steering reaction force.

The solenoid control unit 340 controls the electromagnetic solenoid 42a so that the clutch mechanism 4 is disconnected in the SBW mode and the clutch mechanism 4 is connected in the EPS mode and the manual mode.

The communication control unit 350 controls a communication circuit 351. The communication circuit 351 is a circuit that allows the control device 8 to communicate with respective parts of the vehicle through the CAN 400. The communication control unit 350 outputs a communication control signal to the communication circuit 351 to transmit a control instruction signal corresponding to the communication instruction signal from the mode setting unit 310, to the control device 200.

Meanwhile, when the vehicle is started, the clutch mechanism 4 may be erroneously connected by the influence of biting of a foreign substance etc. In this case, the vehicle steering device 1 is driven with a mechanical angle ratio, instead of a proper angle ratio set by the control device 8 in the SBW mode, although the mode is in the SBW mode. The mechanical angle ratio is an angle ratio mechanically determined when the clutch mechanism 4 is connected for coupling the steering wheel 2 and the turning mechanism.

In this state, if the control device 8 executes the control in the SBW mode with the quick ratio (when the vehicle travels at lower vehicle speed at start), the control device 8 executes the feedback control for the turning motor 5a to compensate a deviation between the quick ratio and the mechanical angle ratio. However, the deviation is not compensated but increased as long as the clutch mechanism 4 is erroneously connected. Then, since the turning mechanism and the steering wheel 2 are connected, the steering wheel 2 is unintentionally rotated (self steer), and the driver may feel uncomfortable.

In contrast, if the control in the SBW mode is executed with the slow ratio (when the vehicle travels at higher vehicle speed) in case of erroneous connection of this clutch mechanism 4, the angle ratio exceeds the target value of the feedback control. The control device 8 attempts to address this state, and the driver becomes difficult to rotate the steering wheel 2 (steering lock).

In this case, the steering lock state does not surprise the driver or give uncomfortable feeling to the driver rather than the case in which the steering wheel 2 is in the self steer state and is unintentionally rotated.

In this embodiment, in the SBW mode at start of the vehicle, control is executed so that the angle ratio is equal to or smaller than the mechanical angle ratio, which is an angle ratio smaller than the proper quick ratio, and hence the self steer can be prevented from occurring.

Hereinafter, processing executed by the mode setting unit 310 that provides the above-described operation is described. FIG. 5 is a flowchart describing processing that is executed by the mode setting unit 310 which may be implemented, in one embodiment, by the control device 8. First, if the vehicle is in an ignition OFF state (engine stop), the clutch mechanism 4 is connected, and the steering wheel 2 and the turning mechanism are coupled. This is for allowing steering of the vehicle even when the vehicle is manually pushed from the rear to move in a state with the engine being stopped.

Then, when the ignition switch (not shown) is turned ON and the vehicle is started, the ignition signal is input to the control device 8, and the mode setting unit 310 determines that the state is at start of the vehicle (YES in S1). In this case, the mode setting unit 310 outputs the communication instruction signal to the communication control unit 350, transmits the control instruction signal from the control device 8 to the control device 200, and gives an instruction so that the braking device 210 is brought into a braking state (S2). That is, the braking device 210 is operated and applies braking to the respective wheels of the vehicle. Hence, the vehicle keeps the stop state. Then, the mode setting unit 310 transmits the mode setting signal to cause the turning motor control unit 320, the reaction force motor control unit 330, and the solenoid control unit 340 to execute operations in the SBW mode (S3).

In the SBW mode, the ratio of the turning angle to the steering angle (angle ratio) is set at the quick ratio when the vehicle travels at lower vehicle speed, and is set at the slow ratio when the vehicle travels at higher vehicle speed as described above. In this case, since the state is at start of the vehicle, the turning angle control map unit 321 typically sets the angle ratio at the quick ratio according to the control map 322.

However, in this embodiment, unlike this typical case, the mode setting unit 310 outputs the angle ratio instruction signal to the turning motor control unit 320 together with the mode setting signal that instructs the operation in the SBW mode, and sets the angle ratio at an angle ratio R (first value) which is a predetermined value equal to or smaller than the mechanical angle ratio (S4). The mechanical angle ratio is an angle ratio mechanically determined when the clutch mechanism 4 is connected for coupling the steering wheel 2 and the turning mechanism as described above. The mechanical angle ratio is an angle ratio being typically smaller than the quick ratio and larger than the slow ratio (the turning angle being smaller than the quick ratio and larger than the slow ratio with respect to the steering angle).

Then, when the torque sensor 7a detects a steering torque equal to or larger than a predetermined value T (second value) (YES in S5), the mode setting unit 310 transmits the mode setting signal to cause the turning motor control unit 320, the reaction force motor control unit 330, and the solenoid control unit 340 to execute the operation in the EPS mode (S6). That is, the case in which the steering torque being the predetermined value T or larger is detected is when the clutch mechanism 4 is erroneously connected. In this case, the mode is shifted to the EPS mode. In this situation, the EPS mode is typically kept until the ignition switch is turned OFF.

Also, if a steering angle being equal to or larger than a predetermined value $\theta$ (third value, fourth value) is detected once (YES in S7), the above-described braking state (S2) is released (S8), and the angle ratio is changed from the above-described angle ratio R to a predetermined value, that is, an angle ratio determined in accordance with the SBW mode (S8). That is, if the steering angle may become the predetermined value $\theta$ or larger, the clutch mechanism 4 is not erroneously connected and steering lock does not occur. Hence, the angle ratio is shifted to the angle ratio determined in the SBW mode (normal quick angle ratio). The braking state is released, and normal driving is allowed. It is to be noted that the predetermined value $\theta$ that serves as a reference value for releasing the braking state (S8) may be different from the predetermined value $\theta$ that serves as a reference value for shifting the angle ratio to the angle ratio determined in the SBW mode (normal quick angle ratio) (S9). That is, the third value may be different from the fourth value in this disclosure.

Unless the vehicle is re-started, after the angle ratio becomes the angle ratio of the normal quick ratio (S9), the turning angle control map unit 321 controls the angle ratio to be the quick ratio when the vehicle travels at lower vehicle speed and to be the slow ratio when the vehicle travels at higher vehicle speed as long as the SBW mode lasts. That is, the processing in FIG. 5 is executed in a short period of time when the vehicle is started.

As described above, at start of the vehicle, the angle ratio is not set at the quick ratio, but is set at the angle ratio R that is smaller than the mechanical angle ratio which is smaller than the quick ratio. Alternatively, the angle ratio is set at the angle ratio R which is equal to the mechanical ratio (S4). Hence, even if the clutch mechanism 4 is erroneously connected due to biting of a foreign substance etc., the angle ratio is set at the mechanical angle ratio that is mechanically determined by the connection, or the angle ratio smaller than the mechanical angle ratio. Owing to this, even at start of the vehicle, self steer due to erroneous connection of the clutch mechanism 4 does not occur, the driver is not surprised due to the occurrence of self steer, and the driver does not feel uncomfortable.

Also, in this case, if the angle ratio R is set to be equal to the mechanical angle ratio, steering is allowed like normal conventional steering, and the driver hardly notices abnormality. However, if the angle ratio R is set to be smaller than the mechanical angle ratio, steering lock occurs, and hence the driver can be notified about the occurrence of abnormality. Accordingly, it can be expected that the driver notices the occurrence of abnormality of the steering system, turns OFF the ignition switch once, and then attempts to re-start the vehicle. Therefore, erroneous connection of the clutch mechanism 4 due to biting of a foreign substance etc. is more likely released.

In this case, if the predetermined steering torque T or larger is detected (S5), the mode is shifted to the EPS mode (S6). The steering torque T is set at a large steering torque (steering torque when the clutch mechanism 4 is erroneously connected) that is not provided in normal situation. Hence, in this case, by shifting the mode to the EPS mode, the driver can execute smooth steering operation.

Also, if the braking state by the braking device 210 is kept since the start so that the vehicle does not start moving (S2), and if the steering angle of the predetermined steering angle $\theta$ or larger is detected (YES in S7), the braking state by the braking device 210 is released (S8) so that the vehicle can start moving. That is, it is not desirable to allow the travel state to be shifted to the travel at high vehicle speed while erroneous connection of the clutch mechanism 4 lasts. Hence, the vehicle can be stopped by the braking device 210 until the driver rotates the steering wheel by the steering angle $\theta$ or larger without occurrence of steering lock and hence the driver intends to drive.

Further, when the vehicle is stopped at start or when the vehicle starts traveling at lower vehicle speed, if steering with the steering angle $\theta$ or larger is executed, the angle ratio is shifted from the angle ratio R to the angle ratio in the SBW mode (S9). Thereafter, the angle ratio is controlled to be the quick ratio when the vehicle travels at lower vehicle speed, and to be the slow ratio when the vehicle travels at higher vehicle speed, as normal operations. That is, if there is no problem for a certain period of time since the vehicle has started, the control can be gradually restored to the normal control. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle steering device, comprising:
   a steering unit that performs an operation for steering a vehicle;
   a turning mechanism that turns a wheel of the vehicle while the turning mechanism is not coupled with the steering unit;
   a clutch mechanism that connects and disconnects the steering unit and the turning mechanism, wherein the vehicle steering device includes a steer-by-wire mode and an electronic-power-steering mode, wherein in the steer-by-wire mode, the clutch mechanism is disconnected, and in the electronic-power-steering mode, the clutch mechanism is connected, and wherein the steer-by-wire mode has a variable angle ratio which is a ratio of the turning angle to the steering angle and is variably set in accordance with a vehicle speed;
   a steering angle detection unit that detects a steering angle of the steering unit; and
   a turning angle control unit that controls a turning angle of the turning mechanism so as to be a turning angle in accordance with the steering angle detected by the steering angle detection unit in the steer-by-wire mode,
   wherein, when the vehicle is powered-on, the vehicle steering device is set to the steer-by-wire mode, the turning angle control unit sets the variable angle ratio to a first value which is smaller than an angle ratio of the electronic-power-steering mode.

2. The vehicle steering device according to claim 1, further comprising:
   a steering torque detection unit that detects a steering torque of the steering unit,
   wherein, when the vehicle is powered-on, if the steering torque detection unit detects a steering torque of a second value or larger, the turning angle control unit controls the turning angle in accordance with the steering torque detected by the steering torque detection unit.

3. The vehicle steering device according to claim 1, further comprising an instruction transmitting unit that transmits an instruction to a braking control unit that controls a braking device of the vehicle to keep a braking state until the steering angle detection unit detects a steering angle of a threshold value or larger after the vehicle is powered-on.

4. The vehicle steering device according to claim 1, wherein, if the steering angle detection unit detects a steering angle of a threshold value or larger after the vehicle is powered-on, the turning angle control unit controls the variable angle ratio to be in a predetermined state.

5. The vehicle steering device according to claim 1, further comprising:
   a steering torque detection unit that detects a steering torque of the steering unit,
   wherein, when the vehicle is powered-on, if the steering torque detection unit detects a steering torque of a second value or larger, the vehicle steering device switches to the electronic-power-steering mode.

6. A vehicle comprising the steering device according to claim 1.

7. The vehicle steering device according to claim 1, wherein the first value is smaller than an angle ratio set when the vehicle is in an idling sate in the steer-by-wire mode.

8. The vehicle steering device according to claim 7, wherein, if the steering angle detection unit detects a steering angle of a threshold value or larger after the vehicle is powered-on, the turning angle control unit controls the variable angle ratio to be the angle ratio set when the vehicle is in the idling sate.

9. A vehicle steering device, comprising:
   a steering mechanism that performs an operation for steering a vehicle;
   a turning mechanism that turns a wheel of the vehicle while the turning mechanism is not coupled with the steering mechanism;
   a clutch mechanism that connects and disconnects the steering mechanism and the turning mechanism, wherein the vehicle steering device includes a steer-by-wire mode and an electronic-power-steering mode, wherein in the steer-by-wire mode, the clutch mechanism is disconnected, and in the electronic-power-steering mode, the clutch mechanism is connected, and wherein the steer-by-wire mode has a variable angle ratio which is a ratio of the turning angle to the steering angle and is variably set in accordance with a vehicle speed;
   a steering angle detector that detects a steering angle of the steering mechanism; and
   a turning angle controller that controls a turning angle of the turning mechanism so as to be a turning angle in accordance with the steering angle detected by the steering angle detector in the steer-by-wire mode,
   wherein, when the vehicle is powered-on, the vehicle steering device is set to the steer-by-wire mode, the turning angle controller sets the variable angle ratio to a first value which is smaller than an angle ratio of the electronic-power-steering mode.

10. A method of controlling a vehicle steering device comprising a steering mechanism that performs an operation for steering a vehicle, a turning mechanism that turns a wheel of the vehicle while the turning mechanism is not coupled with the steering mechanism, a clutch mechanism that connects and disconnects the steering mechanism and the turning mechanism, wherein the vehicle steering device includes a steer-by-wire mode and an electronic-power-steering mode, wherein in the steer-by-wire mode, the clutch mechanism is disconnected, and in the electronic-power-steering mode, the clutch mechanism is connected, and wherein the steer-by-wire mode has a variable angle ratio which is a ratio of the turning angle to the steering angle and is variably set in accordance with a vehicle speed, a steering angle detector that detects a steering angle of the steering mechanism, and a turning angle controller that controls a turning angle of the turning mechanism so as to be a turning angle in accordance with the steering angle detected by the steering angle detector in the steer-by-wire mode, the method comprising:
    detecting, by a computer, whether the vehicle is powered-on, and if so,
    setting, by the computer, the operation mode to the steer-by-wire mode, and setting, by the computer, the variable angle ratio to a first value which is smaller than an angle ratio of the electronic-power-steering mode.

* * * * *